US010324422B2

(12) United States Patent
Kyou et al.

(10) Patent No.: US 10,324,422 B2
(45) Date of Patent: Jun. 18, 2019

(54) COMMUNICATION DEVICE, ELECTRONIC TIMEPIECE, TIME CORRECTING METHOD AND RECORDING MEDIUM

(71) Applicant: CASIO COMPUTER CO., LTD., Shibuya-ku, Tokyo (JP)

(72) Inventors: Kazuho Kyou, Hamura (JP); Makoto Nakagawa, Hamura (JP); Hiroshi Iwamiya, Hamura (JP); Takahiro Tomida, Hamura (JP); Tsutomu Terazaki, Hamura (JP); Ryo Okumura, Hamura (JP); Toshihiro Takahashi, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 96 days.

(21) Appl. No.: 15/442,933

(22) Filed: Feb. 27, 2017

(65) Prior Publication Data

US 2017/0343965 A1 Nov. 30, 2017

(30) Foreign Application Priority Data

May 27, 2016 (JP) .................................. 2016-106106

(51) Int. Cl.
*H04B 7/26* (2006.01)
*G04G 5/00* (2013.01)
(Continued)

(52) U.S. Cl.
CPC ............. *G04R 20/30* (2013.01); *G04G 5/002* (2013.01); *G04G 7/00* (2013.01); *G04G 9/0011* (2013.01);
(Continued)

(58) Field of Classification Search
CPC . G04G 7/00; G04G 7/02; G04G 7/026; G04R 20/06; G04R 20/12; G04R 20/18; G04R 20/24; G04R 20/30; H04B 7/2678
See application file for complete search history.

(56) References Cited

U.S. PATENT DOCUMENTS 6,744,698 B2 * 6/2004 Koyama ................ G04G 19/08
320/132
9,936,381 B2 * 4/2018 Tabata ................ H04W 56/001
(Continued)

FOREIGN PATENT DOCUMENTS

JP 2009-118403 5/2009
KR 2002-0085911 11/2002

OTHER PUBLICATIONS

Extended European Search Report for European Patent Application No. 17164238.2 dated Sep. 21, 2017.

*Primary Examiner* — Daniel P Wicklund
(74) *Attorney, Agent, or Firm* — Amin, Turocy & Watson LLP

(57) ABSTRACT

According to an aspect of the present invention, a device capable of wireless communication includes a counter for counting current time, and a processor for setting a communication mode of the device to one of a notification mode in which the device sends a first notification signal for informing of its existence and a detection mode in which the device detects a second notification signal sent from other device. In the case that the processor changes the communication mode of the device from the notification mode to the detection mode and the second notification signal received in the detection mode includes first time information, the processor corrects time of the counter based on the first time information.

15 Claims, 12 Drawing Sheets

(51) Int. Cl.
*G04G 7/00* (2006.01)
*G04G 9/00* (2006.01)
*G04R 20/06* (2013.01)
*G04R 20/18* (2013.01)
*G04R 20/26* (2013.01)
*G04R 20/30* (2013.01)

(52) U.S. Cl.
CPC ............. *G04R 20/06* (2013.01); *G04R 20/18* (2013.01); *G04R 20/26* (2013.01); *H04B 7/2678* (2013.01); *Y02D 70/10* (2018.01); *Y02D 70/1262* (2018.01); *Y02D 70/14* (2018.01); *Y02D 70/142* (2018.01); *Y02D 70/144* (2018.01); *Y02D 70/20* (2018.01); *Y02D 70/26* (2018.01)

(56) References Cited

U.S. PATENT DOCUMENTS

| | | | |
|---|---|---|---|
| 2008/0031283 A1* | 2/2008 | Curran-Gray | H04J 3/0667 370/503 |
| 2011/0035511 A1* | 2/2011 | Biederman | G04G 7/00 709/248 |
| 2012/0051191 A1* | 3/2012 | Fujisawa | G04R 60/12 368/47 |
| 2012/0274508 A1* | 11/2012 | Brown | G04G 21/02 342/357.25 |
| 2014/0177528 A1* | 6/2014 | Na | H04J 3/0667 370/328 |
| 2015/0256689 A1* | 9/2015 | Erkkila | G06F 1/163 386/228 |
| 2015/0378322 A1* | 12/2015 | Bruins | G04R 20/00 368/47 |
| 2016/0105759 A1* | 4/2016 | Wang | H04W 4/025 455/41.2 |
| 2016/0246264 A1* | 8/2016 | Nagareda | G04R 20/26 |
| 2017/0026778 A1* | 1/2017 | Yamada | H04W 4/008 |
| 2017/0303090 A1* | 10/2017 | Stitt | H04B 17/318 |

\* cited by examiner

| Advertising Packet Type | PDU Type | Connectable | Scannable | Directed | Minimum of Ti |
|---|---|---|---|---|---|
| ADV_IND | 0000 | O | O | X | 20ms |
| ADV_DIRECT_IND | 0001 | O | X | O | 20ms |
| ADV_NONCONN_IND | 0010 | X | X | X | 100ms |
| ADV_SCAN_IND | 0110 | X | O | X | 100ms |

FIG. 5

COMMUNICATION DEVICE, ELECTRONIC TIMEPIECE, TIME CORRECTING METHOD AND RECORDING MEDIUM

CROSS-REFERENCE TO RELATED APPLICATIONS

This application is based upon and claims the benefit of priority under 35 USC 119 of Japanese Patent Application No. 2016-106106 filed on May 27, 2016, the entire disclosure of which is incorporated herein by reference in its entirety for all purposes.

BACKGROUND OF THE INVENTION

1. Field of the Invention

The present invention relates to a communication device, an electronic timepiece, a time correcting method, and a computer readable recording medium for recording a program for executing the method thereon.

2. Description of the Related Art

Conventionally, there exist electronic devices capable of exchanging various kinds of information with other devices using a short-distance wireless communication protocol such as Bluetooth (Registered Trademark). Recently, Bluetooth 4.0 was developed as a new standard for solving the problem of high power consumption that the previous versions of Bluetooth had. Bluetooth version 4.0 and later versions are called Bluetooth Low Energy ("BLE"). Most wearable wireless communication devices such as smart bands, smart watches, smart glasses, etc., which have been recently launched, perform wireless communication using BLE.

By the short-range wireless communication, in particular, portable electronic devices can easily obtain information acquired and held by other electronic devices. Using this technology, interoperability between electronic devices can be achieved, such as sending a notification to a smart watch when a smart phone receives an e-mail or transmitting user information acquired by a smart band to a smart phone.

For example, Japanese Patent Application Laid-Open Publication No. 2009-118403 published on May 28, 2009, discloses that a first device (for example, a mobile phone) transmits time information to a second device (for example, a watch-type terminal) in a state where a connection between the two devices capable of communicating by using a short-distance communication scheme is established such that they can communicate data and that the second device performs time correction by setting its clock circuit to the time information received from the first device.

SUMMARY OF THE INVENTION

According to the technology disclosed in Japanese Patent Application Laid-Open Publication No. 2009-118403, an authentication procedure for a connection which may require tiresome manipulations according to operating systems (OSs) needs to be performed because the time information is exchanged after the connection between the two devices is established. On the other hand, in the case that a communication device is set such that the authentication procedure is not included in order to eliminate such tiresome manipulations, service discovery is performed after the device is connected to other device and communication for exchanging a large amount of information between the devices occurs for the service discovery. Therefore, a mass of data should be exchanged whenever time correction is performed periodically or when a predetermined event occurs. This increases power consumption.

An object of the present invention is to provide a communication device, an electronic timepiece, a time correcting method, and a computer readable recording medium for recording a program capable of performing time correction with low power consumption and without requiring cumbersome manipulations by a user.

According to one aspect of the invention, a device capable of wireless communication includes a counter for counting current time, and a processor for setting a communication mode of the device to one of a notification mode in which the device sends a first notification signal for informing of its existence and a detection mode in which the device detects a second notification signal sent from other device. In the case that the processor changes the communication mode of the device from the notification mode to the detection mode and the second notification signal received in the detection mode includes first time information, the processor corrects time of the counter based on the first time information.

According to one aspect of the invention, a device capable of wireless communication including a counter for counting current time, and a processor for setting a communication mode of the device to one of a notification mode in which the device sends a first notification signal for informing of its existence and a detection mode in which the device detects a second notification signal sent from other device. In the case that the second notification signal is detected in the detection mode, the processor changes the communication mode from the detection mode to the notification mode and generates the first notification signal including data indicating the current time acquired from the counter.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention will more sufficiently be understood by the following detailed description and the accompanying drawings, which are intended exclusively for explanation and do not limit the scope of the present invention. Here:

FIG. 5 is a table showing the types of advertising packets.

DETAILED DESCRIPTION OF THE PREFERRED EMBODIMENT

In the present specification, the invention will be mainly described in connection with embodiments in which it has been applied to Bluetooth, in particular BLE, but its application field is not limited to Bluetooth. For example, the invention can be applied to different wireless communication technologies such as Body Area Network ("BAN"), Wi-Fi (Registered Trademark), and Wi-Fi Direct (Registered Trademark).

Hereinafter, embodiments of the present invention will be described with reference to the accompanying drawings. The scope of the invention is not intended to be limited to the illustrated examples.

<First Embodiment>

Figure 1:
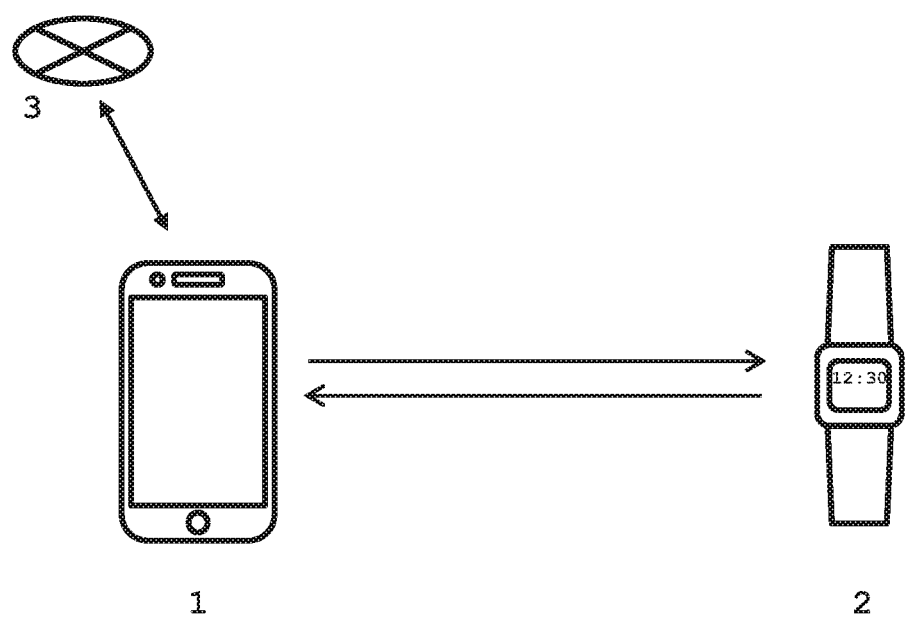
FIG. 1 shows a system including a first device and a second device capable of wireless communication with the first device.

First, a first embodiment of the present application will be described. FIG. 1 shows a system including a first device 1 and a second device 2 which can be connected to and exchange data with the first device using a short distance wireless communication standard such as Bluetooth. FIG. 1 is common to the first embodiment and other embodiments described herein. The first device 1 to which the present invention is applied is a smart phone which is a kind of a mobile phone and is connected to a mobile communication network 3. However, the first device 1 is not limited to this embodiment and any type or any kind of device capable of short distance wireless communication and having a function of recording time can be the first device 1. The second device 2 to which the present invention is applied is an electronic timepiece which is a kind of a watch type terminal. However, the second device 2 is not limited to this embodiment and any type or any kind of device capable of short distance wireless communication and having a function of recording time can be the second device. For example, the second device 2 may be a digital camera, a healthcare appliance such as a digital body weight scale, or a wearable device such as a smart band. In the case that an event to be notified to a user occurs (for example, the first device receives an email or a call), the first device 1 can notify the second device 2 of the event via short distance wireless communication. The second device 2 can transmit acquired data (for example, a travel distance, an altitude, or a pulse rate of the user) to the first device via the short distance wireless communication.

Figure 2A:
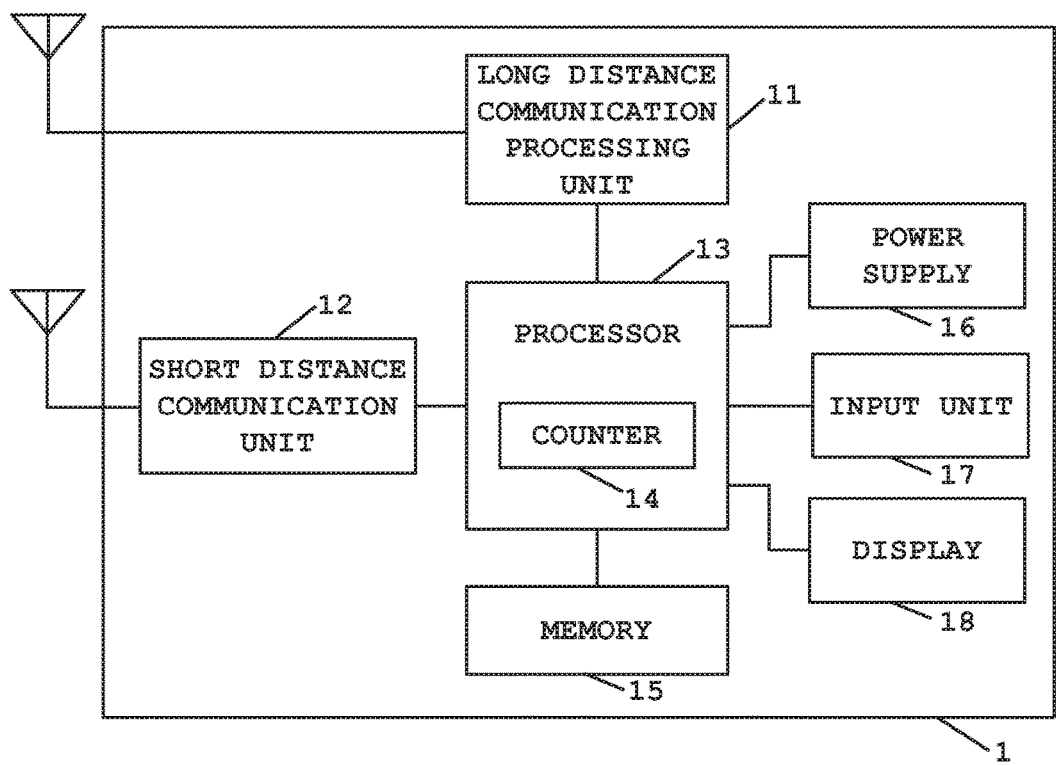
FIG. 2A is a block diagram showing a hardware configuration of a smart phone 1 which is the first device according to an embodiment of the invention.
Figure 2B:
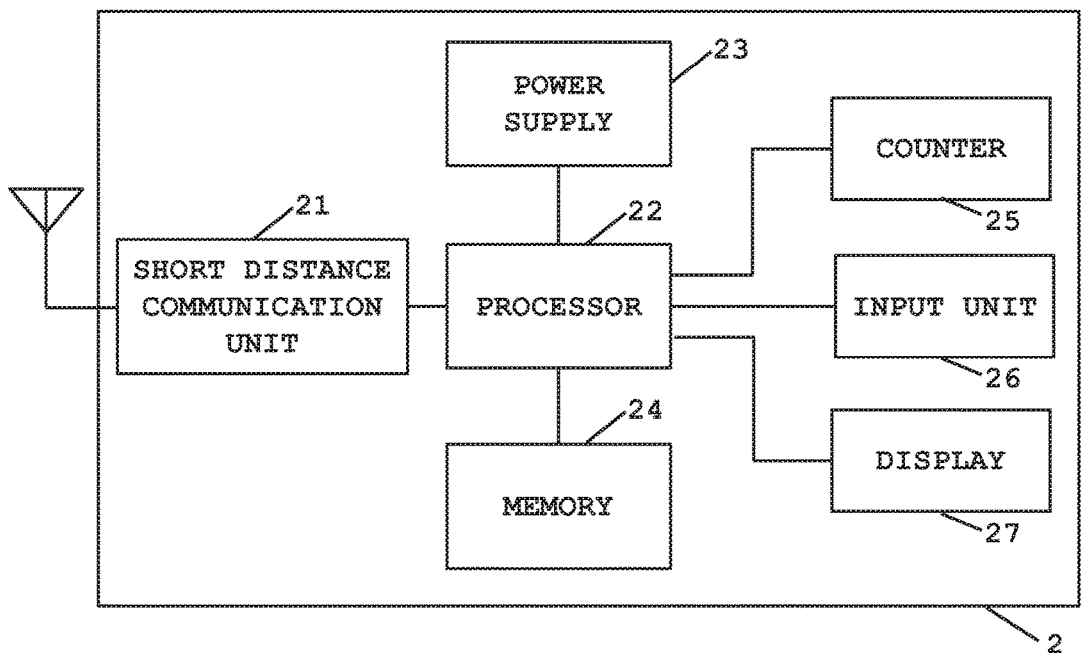
FIG. 2B is a block diagram showing a hardware configuration of an electronic timepiece 2 which is the second device according to an embodiment of the invention.

FIG. 2A is a block diagram showing a hardware configuration of the smart phone 1 which is the first device according to the embodiment of the invention. FIG. 2B is a block diagram showing a hardware configuration of the electronic timepiece 2 which is the second device according to the embodiment of the invention.

As shown in FIG. 2A, the smart phone 1 includes a long distance communication processing unit 11, a short distance communication unit 12, a processor 13, a memory 15, a power supply 16, an input unit 17, and a display 18. The processor 13 includes a counter 14. The long distance communication processing unit 11 makes the smart phone 1 serve as a mobile phone by communicating with a base station of a cellular network system such as 3G and LTE. The long distance communication processing unit 11 includes an amplifier for amplifying signals received or transmitted via an antenna, a transceiver, a digital baseband processor, a voice input circuit, or a playback circuit, but descriptions and drawings of these components are omitted because they are well-known. The counter 14 can hold accurate time information by acquiring accurate time data via the long distance communication processing unit 11 from the mobile communication network 3. As will be described later, the smart phone 1 notifies the electronic timepiece 2 of the time information held by the counter 14.

The short distance communication unit 12 makes the smart phone 1 be able to communicate with the electronic timepiece 2 which is the second device by a short distance wireless communication scheme such as Bluetooth or Wi-Fi. The short distance communication unit 12 includes a circuit for transforming an electromagnetic wave received via an antenna into an electric signal or transforming an electric signal input from the processor 13 into an electromagnetic wave. In the present embodiment, the short distance communication unit 12 supports BLE.

The processor 13 controls operations of the smart phone 1 and is an application processor, for example. While the processor 13 includes the counter 14 in the present embodiment, the counter 14 may be a separate element in different embodiments. The memory 15 is used to store computer program instructions executed by the processor 13, software such as firmware, data required by the processor 13, and/or data resulted from processing by the processor 13. The memory 15 includes one or more storage devices such as a RAM (Random Access Memory), a ROM (Read Only Memory), a flash memory, or a disk drive integrated into or removable from the smart phone 1. Alternatively, the memory 15 may be integrated into the processor 13.

The power supply 16 includes a battery and a power management unit (not shown in the drawing). The input unit 17 includes one or more keys, one or more switches, and/or a touch panel (not shown in the drawing). Various kinds of data are input according to manipulations of the input unit 17 by the user. The display 18 includes a display device such as an LCD or an OLED and a driving circuit (not shown in the drawing).

As shown in FIG. 2B, the electronic timepiece 2 includes a short distance communication unit 21, a processor 22, a power supply 23, a memory 24, a counter 25, an input unit 26, and a display 27. The short distance communication unit 21 makes the electronic timepiece 2 be able to communicate with the smart phone 1 which is the first device by the short distance wireless communication scheme such as Bluetooth or Wi-Fi. The short distance communication unit 21 includes a circuit for transforming an electromagnetic wave received via an antenna into an electric signal or transforming an electric signal input from the processor 22 into an electromagnetic wave. In the present embodiment, the short distance communication unit 21 supports BLE.

The processor 22 controls operations of the electronic timepiece 2. The power supply 23 includes a battery and a power management unit (not shown in the drawing). The memory 24 is used to store computer program instructions executed by the processor 22, software such as firmware, data required by the processor 22, and/or data resulted from processing by the processor 22. The memory 24 includes one or more storage devices such as a RAM (Random Access Memory), a ROM (Read Only Memory), a flash memory, or a disk drive integrated into or removable from the electronic timepiece 2. Alternatively, the memory 24 may be integrated into the processor 22.

The counter 25 includes a clock circuit for generating time signals, for example, from signals generated by a system clock or an oscillator (not shown in the drawing) and outputs current time. The counter 25 generates time information by counting current time and outputs the generated time information to the processor 22. The counter 25 may be integrated into the processor 22. The input unit 26 includes one or more keys, one or more switches, and/or a touch panel (not shown in the drawing). Various kinds of data are input according to manipulations of the input unit 26 by the user. The display 27 includes a display device such as an LCD or an OLED and a driving circuit (not shown in the drawing) and displays information such as the current time.

The electronic timepiece 2 normally displays the current time, which is being counted by the counter 25, using the display 27. As will be described later, in the case that the electronic timepiece 2 receives data indicating current time of the counter 14 from the smart phone 1 via the short distance communication unit 21, time of the electronic timepiece 2 is synchronized with that of the smart phone 1 by setting the counter 25 to the time indicated by the received data.

The system shown in FIG. 1, and the smart phone 1 and the electronic timepiece 2 shown in FIGS. 2A and 2B, respectively, are merely examples and do not limit the scope of systems or devices capable of implementing time correction processes described herein.

Next, operations for time correction of the smart phone 1 and the electronic timepiece 2 are described. The operations are performed to adjust time of the electronic timepiece 2 to that of the smart phone 1. In the present application, both of the smart phone 1 and the electronic timepiece 2 support Bluetooth, in particular, BLE. According to the Bluetooth specification (see Bluetooth Specification Version 4.2 (2014)), packets of the BLE Protocol are classified into two kinds: advertising packets and data packets. A device uses an advertising packet to inform other device of its existence and request connection to the other device. The advertising packet is transmitted and received via an advertise channel. On the other hand, a data packet is exchanged after a connection between the two devices is established.

Further, according to the BLE Protocol, a plurality of devices communicates in a broadcast mode or a connection mode. In the broadcast mode (also referred to as an "advertise mode"), a device periodically sends advertise signals to all nearby devices without specifying one of them. The specification defines two roles, one of which a device plays in the broadcast mode: Broadcaster and Observer. A broadcaster (also referred to as an "advertiser") periodically sends Non-Connectable advertising packets regardless of whether other devices are capable of receiving signals or not. An observer is a device which performs scanning periodically to receive the Non-Connectable advertising packet sent from the broadcaster. The broadcast mode is used mainly in the case that one device informs other device(s) of its existence or in the case that a small amount of data (smaller than 31 byte) should be transmitted.

In the case that bidirectional data communication between two devices is required or one device should transmit a large amount of data which cannot be transmitted by an advertising packet to the other device, the two devices communicate in the connection mode. The specification defines two roles, one of which a device plays in the connection mode: Central (also referred to as a "master") and Peripheral (also referred to as a "slave"). A Central device periodically scans for a Connectable advertising packet sent from other device(s) and requests connection to a proper one of the other device(s). A Peripheral device periodically sends Connectable advertising packets in order to form a connection to other device and form a connection to a Central device by receiving a Connection Request sent from the Central device which received the Connectable advertising packet. According to many embodiments of the present invention, the smart phone 1 and the electronic timepiece 2 switch their roles and exchange information with each other by advertising packets to perform time correction without establishing a connection between the two devices.

Figure 3:
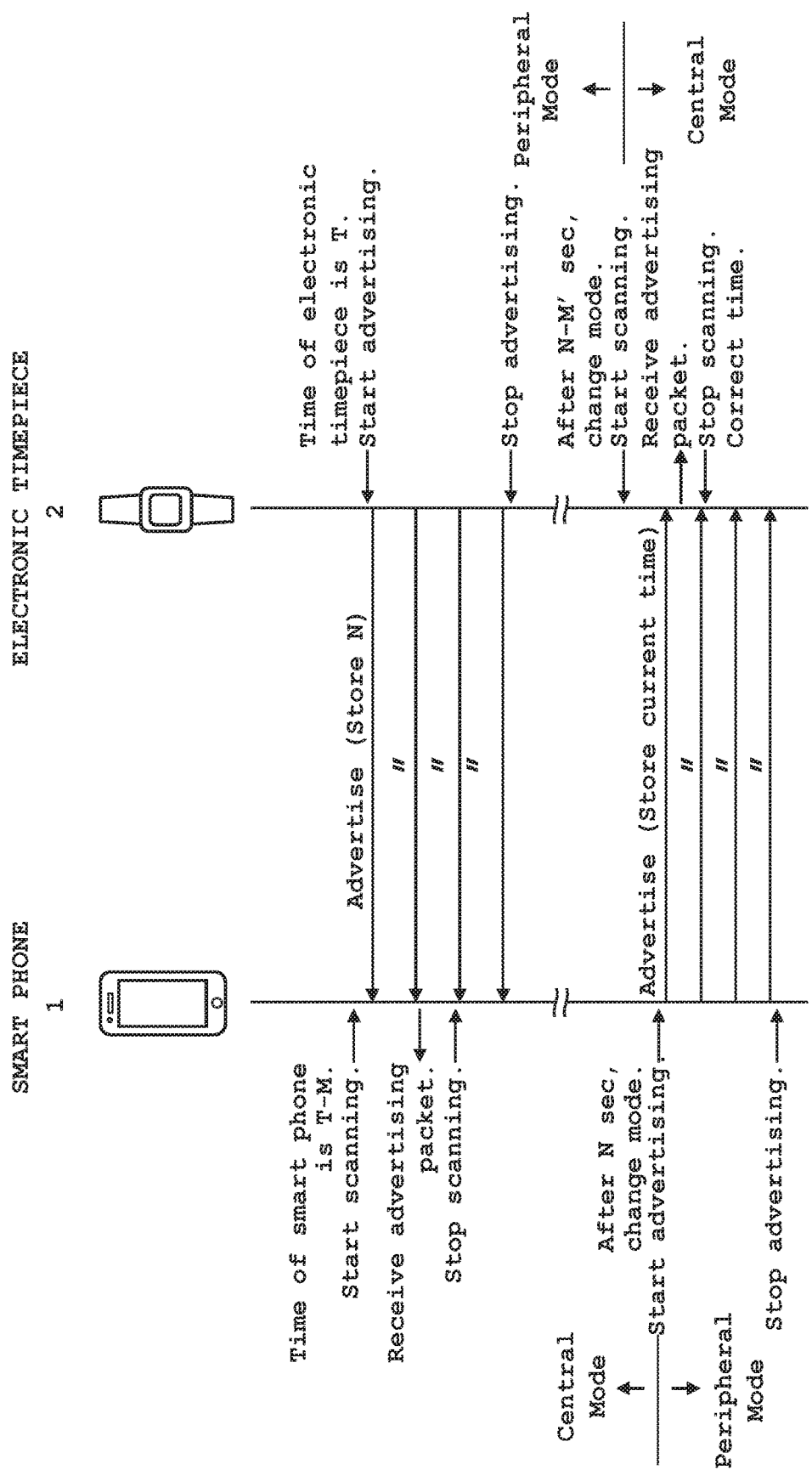
FIG. 3 is a schematic diagram for showing a time correction process according to a first embodiment of the invention.

FIG. 3 is a schematic diagram for showing a time correction process according to the embodiment. As shown in FIG. 3, the time correction process of the present embodiment starts at the time T (hereinafter, referred to as a "starting time") every day. For example, the time correction process starts at 12:00 AM every day. In the present embodiment, the period of the starting time is one day, that is, 24 hours. According to embodiments, the period of the starting time can be set to be longer or shorter than one day, or set irregularly. The starting time should be set to be the same in both of the smart phone 1 and the electronic timepiece 2. It may be preset when the devices are designed or set by the user. When the time of the counter 14 is T-M, the smart phone 1 sets the mode of the short distance communication unit 12 to Central and starts scanning. Scanning is an operation to detect an advertising packet sent from the electronic timepiece 2. In the present embodiment, a time width during which the scanning is performed is set to Ts1. In the case that an advertising packet is received from the electronic timepiece 2 before Ts1 elapses, the smart phone 1 stops scanning. The Bluetooth Protocol defines an advertising packet as a type of packet which is used in the case that one device informs nearby device(s) of its existence or transmits a small amount of data to the nearby device(s). Here, M is a margin which is intended to securely receive communication from the electronic timepiece 2. Since the smart phone 1 starts scanning M earlier than the time T (i.e. the time T-M), the smart phone 1 can reliably receive a packet sent from the electronic timepiece 2 with a reduced possibility of missing the first packet, even in the case that there is a difference between the time of the smart phone 1 and the time of the electronic timepiece 2 and the electronic timepiece 2 sends the packet earlier than the time T of the smart phone 1. In the present embodiment, since the time correction process is performed once every 24 hours, it is desirable to set M to M>Te where Te is a time error of the electronic timepiece 2 assumed for 24 hours which is one period.

Figure 4:
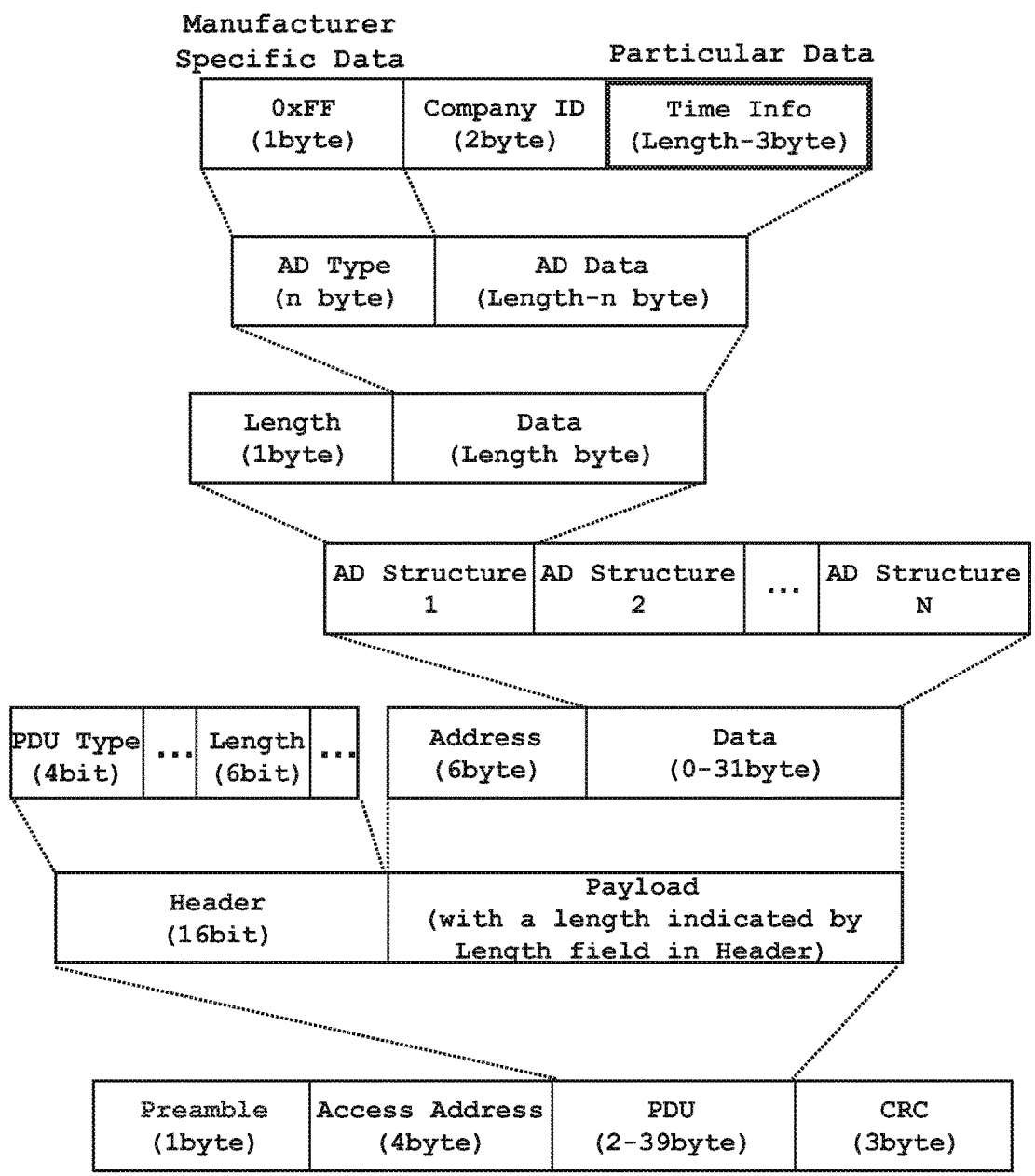
FIG. 4 shows an example of a structure of an advertising packet according to an embodiment of the invention.

When the time of the counter 25 is T, the electronic timepiece 2 sets the mode of the short distance communication unit 21 to Peripheral and stores a predetermined time information N in an advertising packet. For example, the time information N is stored in a data field of a payload of a PDU of the advertising packet, as shown in FIG. 4. A structure of the advertising packet will be described later. The time information N indicates a period of time for which the smart phone 1 which has received the advertising packet waits to switch its role. N is set to a value in units of seconds in the present embodiment. However, the unit of the time information N is not limited to seconds, and it is sufficient to use a common unit in the smart phone 1 and the electronic timepiece 2. It is desirable that N is set to be larger than the time required for the smart phone 1 and the electronic timepiece 2 to switch their roles. As shown in FIG. 3, the electronic timepiece 2 repeatedly transmits the advertising packet in which N is stored for a predetermined time width Ta2.

The smart phone 1 stops scanning if it receives the advertising packet sent from the electronic timepiece 2 within the time width Ts1. The smart phone 1 extracts the time information N from the received advertising packet. The smart phone 1 changes the mode of the short distance communication unit 12 to Peripherals after N seconds from when it stops scanning. The smart phone 1 extracts current time Th from the clock unit 14 and stores it in an advertising packet. For example, the current time Th is stored in a data field of a payload of a PDU of the advertising packet, as shown in FIG. 4. Then, the smart phone 1 repeatedly transmits the advertising packet in which Th is stored for a predetermined time width Ta1. After Ta1 elapses, the smart phone 1 stops advertising. On the other hand, in the case that no advertising packet is received even if scanning is performed during the time width Ts1, the processor 13 controls the display 18 to display a message indicating that an error has occurred. By this, the user can be requested to perform a manual operation for time correction, for example.

The electronic timepiece 2 stops advertising after Ta2 elapses. Then, after N-M' seconds, the electronic timepiece 2 changes the mode of the short distance communication unit 21 to Central and starts scanning. In the present embodiment, a time width during which the scanning is performed is set to Ts2. The electronic timepiece 2 stops scanning if the advertising packet from the smart phone 1 is received before Ts2 elapses. M' is a time margin set to start scanning as soon as possible in order to lower a possibility of missing the first advertising packet which the smart phone 1 sends by starting advertising after N seconds. Here, N-M' should be longer than the time required for the electronic timepiece 2 to change the mode.

In the case that the electronic timepiece 2 receives the advertising packet sent from the smart phone 1 within the time width Ts2, the electronic timepiece 2 stops scanning. The electronic timepiece 2 extracts the time information Th from the received advertising packet and sets the counter 25 to Th to perform time correction. In the case that no advertising packet is received even if the scanning is performed during the time width Ts2, the processor 22 controls display 27 to display a message indicating that an error has occurred. By this, the user can be requested to perform a manual operation for time correction, for example.

FIG. 4 shows an embodiment of a structure of an advertising packet sent from the electronic timepiece 2 to the smart phone 1, or from the smart phone 1 to the electronic timepiece 2. FIG. 5 is a table showing the types of advertising packets. As shown in FIG. 5, there are four types of advertising packets used for Bluetooth communication. A value set in the PDU Type field of the header of the PDU of a packet indicates the type of the packet. ADV_IND is used in connectable undirected advertising events. The connectable undirected advertising event type allows simple information inquiry (that is, scannable). The simple information inquiry means a procedure in which a device performing scanning (referred to as a "scanner") transmits to the device performing advertising ("advertiser") a scan request (SCAN_REQ PDU) to request additional information about the advertiser (for example, device information or services provided by the advertiser) before connection. ADV_DIRECT_IND is used in connectable directed advertising events. ADV_DIRECT_IND has no data part in which advertising data can be stored. Therefore, in the case that the advertiser's data is required to be transmitted by advertisement, ADV_DIRECT_IND cannot be used. ADV_NONCONN_IND is used in non-connectable undirected advertising events. ADV_SCAN_IND is used in scannable undirected advertising events. The scannable undirected advertising event type allows the simple information inquiry (that is, only simple information inquiry is possible for any device).

Figure 6:
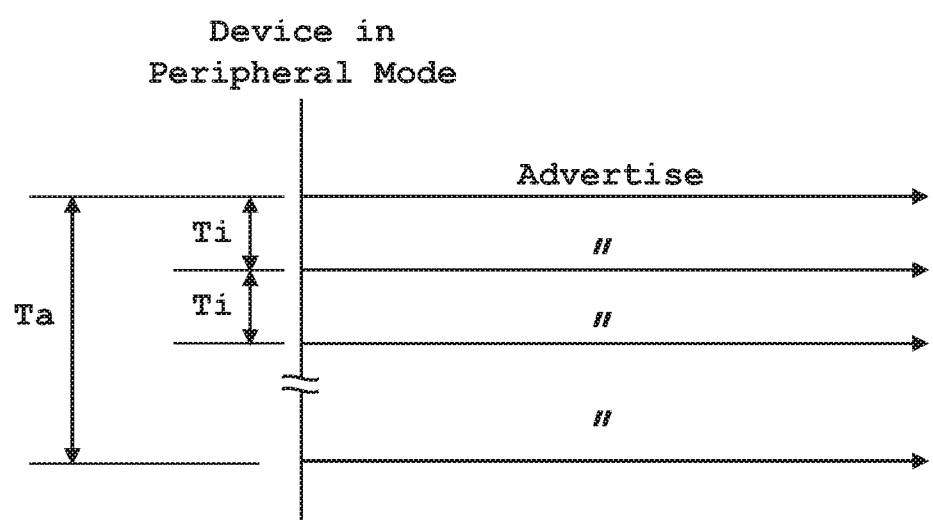
FIG. 6 is a diagram for explaining an advertising time width Ta and a transmission interval Ti of an advertising packet.

As shown in FIG. 5, the Bluetooth specification specifies a possible minimum value of an advertising interval (Ti; see FIG. 6), that is, a time interval at which an advertising packet is repeatedly transmitted, for each type of advertising packet. Ti can be set within the range of 20 milliseconds to 10.24 seconds in 0.625 millisecond intervals. It is possible to set a minimum value of Ti to 20 milliseconds for each of ADV_IND and ADV_DIRECT_IND, and to 100 milliseconds for each of ADV_NONCONN_IND and ADV_SCAN_IND. As shown in FIG. 6, a device in the Peripheral mode repeatedly sends an advertising packet at intervals of Ti during a predetermined time width Ta. Even in the case that a device in the Central mode cannot receive one (that is, the first) or more advertising packets, it can receive the advertising packet sent later than the one or more packets within a short time if the time interval Ti at which the advertisement packet is repetitively transmitted is short. Such a short time interval Ti can also reduce the time width Ta.

In the present embodiment, the ADV_IND type advertising packet is used as shown in FIG. 4. Time information is stored in a data part (which is a part in which data of the sender of the packet can be stored) of the payload of the PDU of the packet, as shown in the top of FIG. 4. In the advertising packet transmitted from the electronic timepiece 2 to the smart phone 1, the predetermined N is stored as the time information. In the advertising packet transmitted from the smart phone 1 to the electronic timepiece 2, the current time Th is stored as the time information. According to embodiments, one or more types of advertising packets can be used. The two devices can use different types of advertising packets depending on the specifications of the devices.

As described above, in the case that the electronic timepiece 2 receives the advertising packet from the smart phone 1, the electronic timepiece 2 immediately extracts the time information Th from the advertising packet and performs time correction. There is a possibility that a reception error of the advertising packet may occur due to radio wave interference or the like. Therefore, the smart phone 1 continues scanning for the time width Ts1 and repeats advertisement for the time width Ta1. In addition, the electronic timepiece 2 repeats advertisement for the time width Ta2 and continues scanning for the time width Ts2. In the case that the time widths Ta1, Ta2, Ts1, and Ts2 are set to too large values and errors occur several times in reception of the advertising packets, the electronic timepiece 2 will receive the advertising packet from the smart phone 1 in which Th is stored after a certain period of time from when the smart phone 1 stores Th in the advertising packet. This causes a difference corresponding to the certain period of time between the time of the smart phone 1 and the time of the electronic timepiece 2. Therefore, it is desirable to set each of the time widths Ta1, Ta2, Ts1, and Ts2 as short as possible within a possible range. Preferably, the time widths are one second or shorter. As described above, if an advertising packet with short Ti (that is, the ADV_IND type) is used, Ta can be shortened. Further, it is possible to set the time widths Ta1 and Ta2 during which advertising is performed to different values. Similarly, it is possible to set the time widths Ts1 and Ts2 during which scanning is performed to different values. Ta2 and Ts1 need not to be the same value. Similarly, Ta1 and Ts2 need not to be the same value.

Figure 7A:
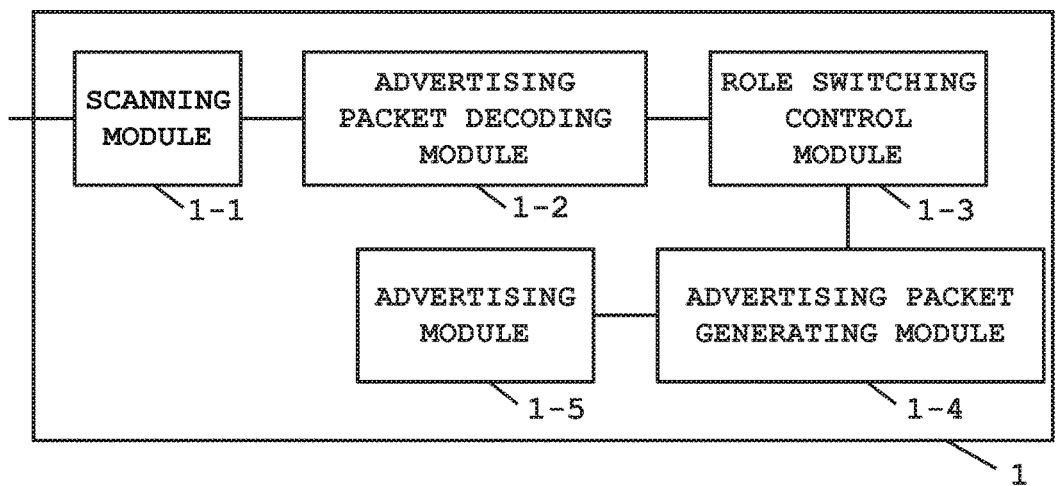
FIG. 7A is a functional block diagram of the smart phone 1 for performing a time correction process according to an embodiment of the invention.
Figure 7B:
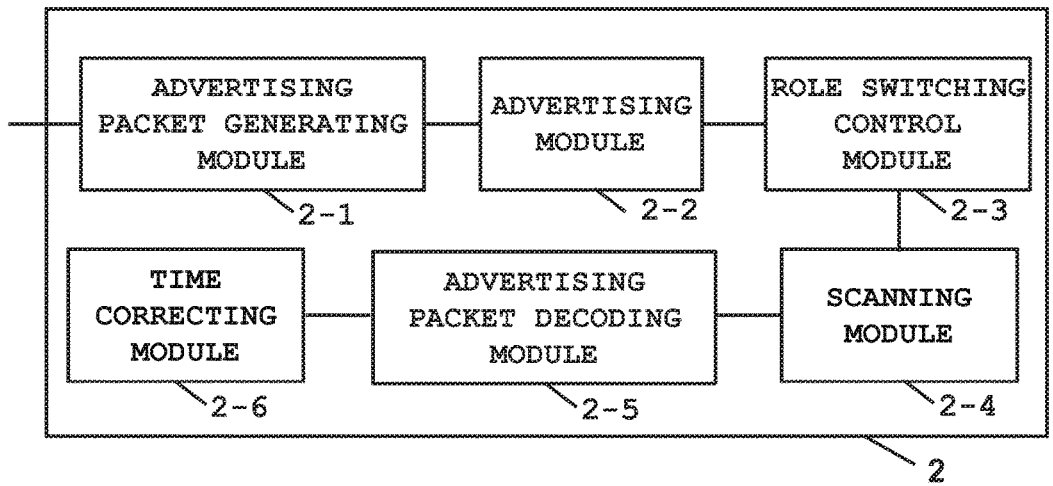
FIG. 7B is a functional block diagram of the electronic timepiece 2 for performing a time correction process according to an embodiment of the invention.

FIG. 7A is a functional block diagram of the smart phone 1 for performing the time correction process according to the embodiment. FIG. 7B is a functional block diagram of the electronic timepiece 2 for performing the time correction process according to the embodiment.

As shown in FIG. 7A, the smart phone 1 includes a scanning module 1-1, an advertising packet decoding module 1-2, a role switching control module 1-3, an advertising packet generating module 1-4, and an advertising module 1-5. The modules 1-1 to 1-5 can be configured by software, hardware, or combinations thereof. The scanning module 1-1 scans for an advertising packet for a predetermined time width Ts periodically when the smart phone 1 operates in the Central mode. As described above, in the present embodiment, the scanning module 1-1 starts scanning when the time of the smart phone 1 is T-M and stops scanning if the smart phone 1 receives an advertising packet including the time information N before the scan time width Ts1 elapses. In the case that the advertising packet is not received within the scan time width Ts1, the smart phone 1 notifies the user of an error message. The advertising packet decoding module 1-2 decodes an advertising packet received during the scan period Ts and extracts data stored in the advertising packet. As described above, in the present embodiment, the advertising packet decoding module 1-2 extracts the time information N stored in the advertising packet received from the electronic timepiece 2. The role switching control module 1-3 changes the communication mode (i.e. the role) of the smart phone 1 from the Central mode to the Peripheral mode or from the Peripheral mode to the Central mode. As described above, in the present embodiment, the role switching control module 1-3 changes the communication mode of the smart phone 1 from the Central mode to the Peripheral mode N seconds after the scanning is stopped.

The advertising packet generating module 1-4 generates an advertising packet when the smart phone 1 operates in the Peripheral mode. As described above, in the present embodiment, the advertising packet generating module 1-4 generates an advertising packet including current time information by storing the current time Th in a data part of the advertising packet. The advertising module 1-5 sends an advertising packet when the smart phone 1 operates in the Peripheral mode. As described above, in the present embodiment, the advertising module 1-5 sends the advertising packet including the information on the current time Th for the time width Ta1 at intervals of Ti1.

As shown in FIG. 7B, the electronic timepiece 2 includes an advertising packet generating module 2-1, an advertising module 2-2, a role switching control module 2-3, a scanning module 2-4, an advertising packet decoding module 2-5, and a time correcting module 2-6. The advertising packet generating module 2-1 generates an advertising packet when the electronic timepiece 2 operates in the Peripheral mode. As described above, in the present embodiment, the advertising packet generating module 2-1 generates an advertising packet by storing the time information N in a data part of the advertising packet. The advertising module 2-2 sends an advertising packet when the electronic timepiece 2 operates in the Peripheral mode. As described above, in the present embodiment, the advertising module 2-2 starts to send the advertising packet including the time information N when the time of the electronic timepiece 2 is T. The advertising is repeated for the time width of Ta2 at intervals of Ti2. The role switching control module 2-3 changes the communication mode (i.e. the role) of the electronic timepiece 2 from the Peripheral mode to the Central mode or from the Central mode to the Peripheral mode. As described above, in the present embodiment, the role switching control module 2-3 changes the communication mode of the electronic timepiece 2 from the Peripheral mode to the Central mode N-M' seconds after the advertising is stopped.

The scanning module 2-4 scans for an advertising packet for the predetermined time width Ts2 when the electronic timepiece 2 operates in the Central mode. As described above, in the present embodiment, the scanning module 2-4 starts scanning N-M' seconds after the electronic timepiece 2 stops the advertising and stops scanning if the electronic timepiece 2 receives an advertising packet including the information on the time Th before the scan time width Ts2 elapses. In the case that the advertising packet is not received within the scan time width Ts2, the electronic timepiece 2 notifies the user of an error message. The advertising packet decoding module 2-5 decodes an advertising packet received during the scan period Ts2 and extracts data stored in the advertising packet. As described above, in the present embodiment, the advertising packet decoding module 2-5 extracts the current time Th from the advertising packet received from the smart phone 1. The time correcting module 2-6 corrects time of the counter included in the electronic timepiece 2 according to the time information extracted by the advertising packet decoding module 2-5. As described above, in the present embodiment, the time correcting module 2-6 sets the counter 25 to the time information stored in the advertising packet received from the smart phone 1 (i.e. the time of the counter 14 of the smart phone 1) to adjust the time of the electronic timepiece 2 to the time of the smart phone 1. By this, the electronic timepiece 2 can synchronize with the time of the smart phone 1.

Figure 8:
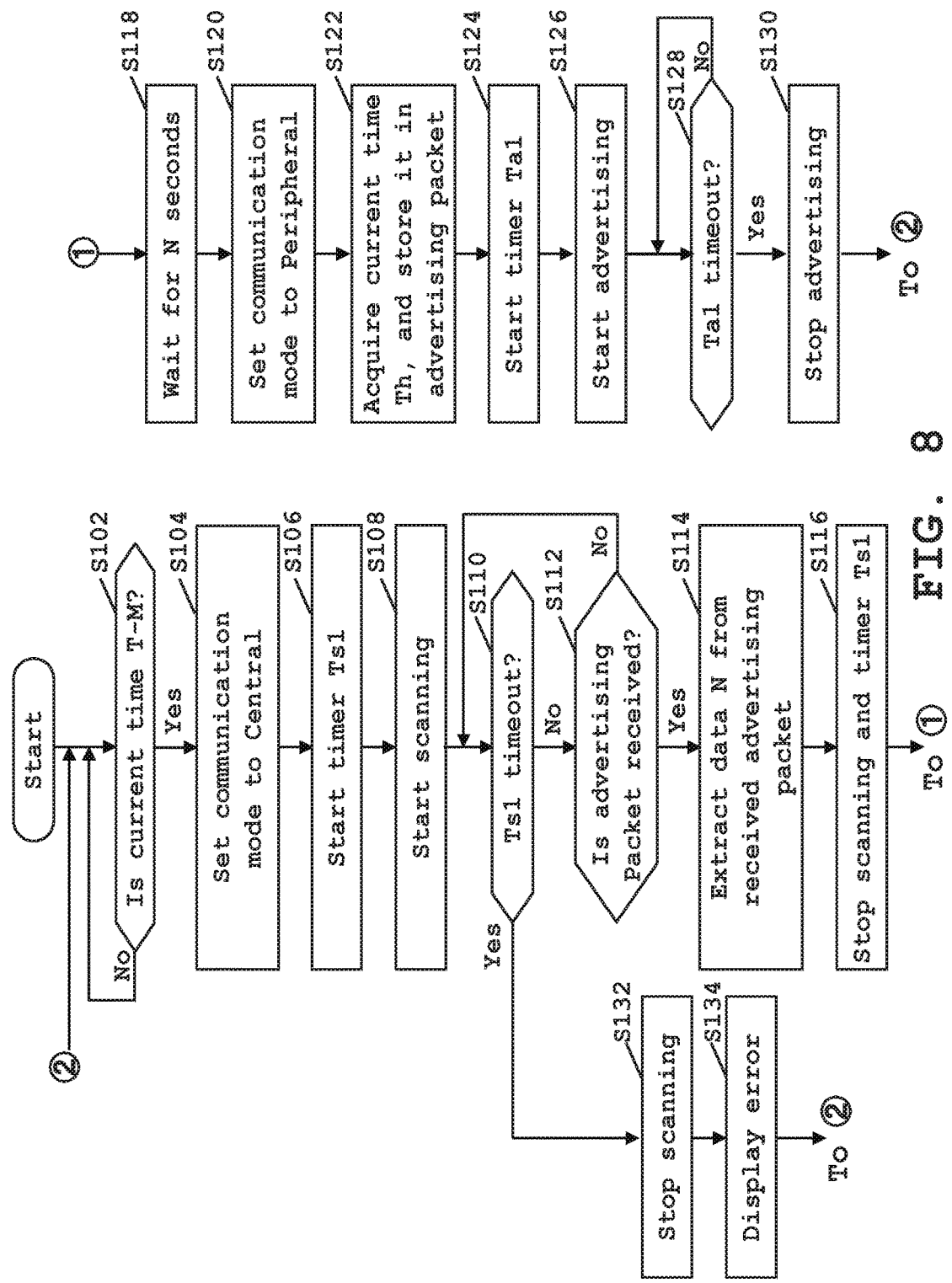
FIG. 8 is a flow chart showing an operation sequence of the smart phone 1 in the time correction process according to the first embodiment of the invention.

FIG. 8 is a flow chart showing an operation sequence of the smart phone 1 in the time correction process according to the present embodiment. First, the processor 13 determines whether or not the time of the counter 14 is T-M (Step S102). In the case that the time of the counter 14 is not T-M (Step S102: No), the smart phone 1 does not proceed with the time correction process. In the case that the time of the counter 14 is T-M (Step S102: Yes), the communication mode of the smart phone 1 is set to the Central mode (Step S104). In the case that the communication mode is already the Central mode, the smart phone 1 maintains the Central mode.

The processor 13 starts a timer to check whether or not the predetermined time Ts1 has elapsed (Step S106), and starts scanning (Step S108). Ts1 is a time width during which the smart phone 1 performs scanning in order to receive an advertising packet. In the case that the timer does not reach Ts1, that is, before a timeout occurs (Step S110: No), the processor 13 checks whether or not an advertising packet is received (Step S112). In the case that no advertising packet is received (Step S112: No), the process returns to Step S110.

In the case that an advertising packet is received before the timeout occurs (Step S112: Yes), data N which is the time information is extracted from the data part of the received advertising packet (Step S114). Then, the scanning and the timer for checking Ts1 are stopped (Step S116). After waiting for a period of time indicated by the extracted time information (N seconds in the present embodiment) (Step S118), the processor 13 sets the mode of the short distance communication unit 12 to the Peripheral mode (Step S120). In other words, the communication mode of the smart phone 1 changes from the Central mode to the Peripheral mode. The processor 13 acquires the current time Th from the counter 14 and stores it in an advertising packet (Stpe S122). For example, the current time Th is stored in the payload of the PDU of the ADV_IND type advertising packet, as described above with respect to FIG. 4. The processor 13 starts a timer to check whether or not the predetermined time Ta1 has elapsed (Step S124), and starts advertising (Step S126). In the case that the timer does not reach Ta1, that is, before a timeout occurs (Step S128: No), the advertising packet in which the current time Th is stored is repeatedly sent at the predetermined time intervals of Ti1. In the case that the timer reaches Ta1, that is, the timeout occurs (Step S128: Yes), the smart phone 1 stops advertising (Step S130) and the process returns to Step S102.

In the case that the timer reaches Ts1 in a state where no advertising packet is received (Step S110: Yes), the scanning is stopped (Step S132). In other words, in the case that no advertising packet is received even if scanning is performed for the time width Ts1, the display 18 displays a message that an error has occurred because the time correction process cannot proceed (Step S134). Then, the process returns to Step S102.

Figure 9:
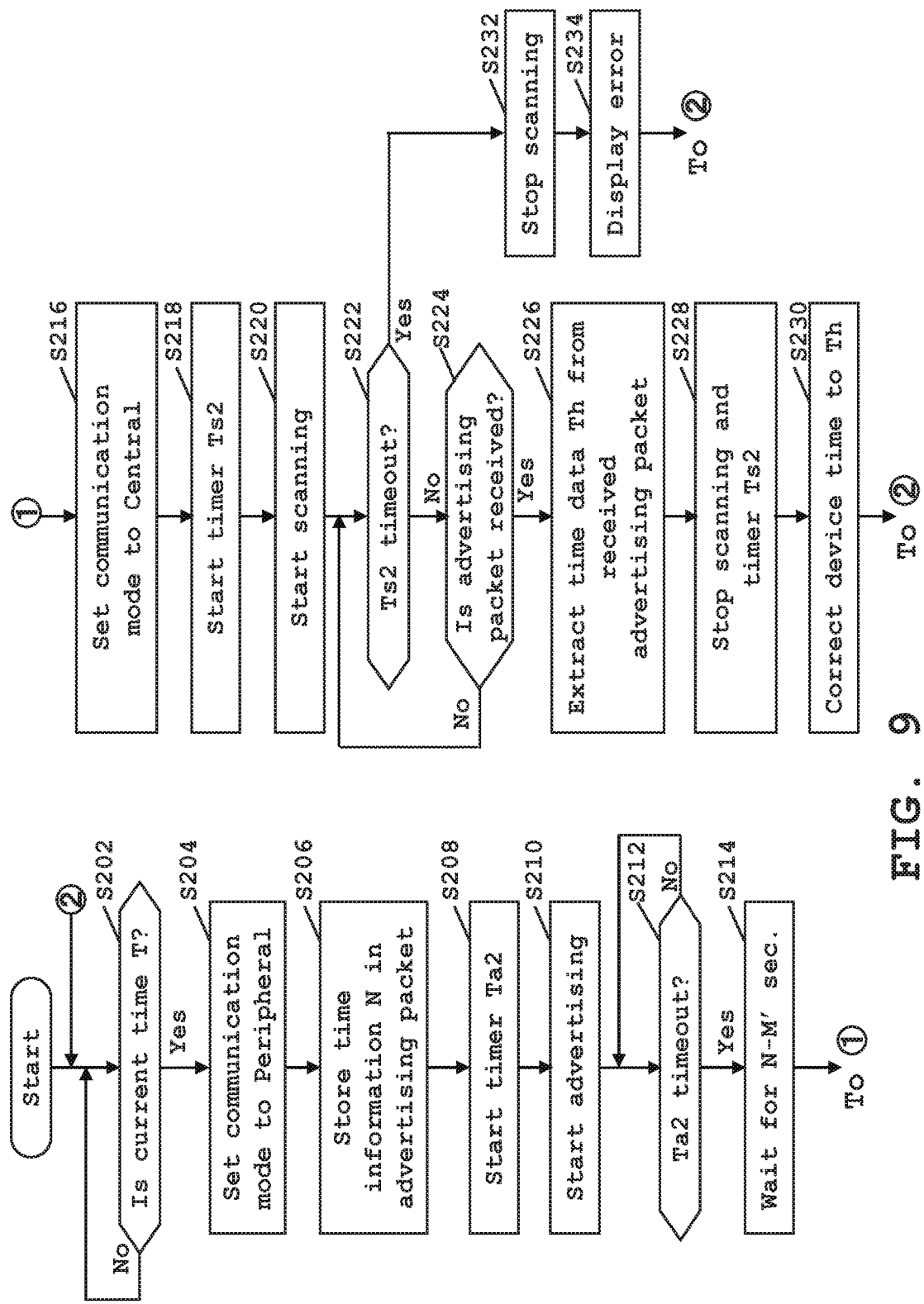
FIG. 9 is a flow chart showing an operation sequence of the electronic timepiece 2 in the time correction process according to the first embodiment of the invention.

FIG. 9 is a flow chart showing an operation sequence of the electronic timepiece 2 in the time correction process according to the present embodiment. First, the processor 22 determines whether or not the time of the counter 14 is T (Step S202). In the case that the time of the counter 25 is not T (Step S202: No), the electronic timepiece 2 does not proceed with the time correction process. In the case that the time of the counter 25 is T (Step S202: Yes), the communication mode of the electronic timepiece 2 is set to the Peripheral mode (Step S204). In the case that the communication mode is already the Peripheral mode, the electronic timepiece 2 maintains the Peripheral mode.

The processor 22 stores the predetermined time information N in an advertising packet (Step S206). For example, the time information N is stored in the payload of the PDU of the ADV_IND type advertising packet, as described above with respect to FIG. 4. The processor 22 starts a timer to check whether or not the predetermined time Ta2 has elapsed (Step S208), and starts advertising (Step S210). In the case that the timer does not reach Ta2, that is, before a timeout occurs (Step S212: No), the advertising packet in which the time information N is stored is repeatedly sent at the predetermined time intervals of Ti2.

In the case that the timer reaches Ta2, that is, the timeout occurs (Step S212: Yes), the electronic timepiece 2 stops advertising. After waiting for N-M' seconds (Step S214), the processor 22 sets the mode of the short distance communication unit 21 to the Central mode (Step S216). In other words, the communication mode of the electronic timepiece 2 changes from Peripheral to Central at Step S216. The processor 22 starts a timer to check whether or not the predetermined time Ts2 has elapsed (Step S218), and starts scanning (Step S220). Ts2 is a time width during which the electronic timepiece 2 performs scanning in order to receive an advertising packet from the smart phone 1. In the case that the timer does not reach Ts2, that is, before a timeout occurs (Step S222: No), the processor 22 checks whether or not an advertising packet is received (Step S224). In the case that no advertising packet is received (Step S224: No), the process returns to Step S222.

In the case that an advertising packet is received before the timeout occurs (Step S224: Yes), data Th which is the time information is extracted from the data part of the received advertising packet (Step S226). Then, the scanning and the timer for checking Ts2 are stopped (Step S228). The processor 22 corrects the time of the electronic timepiece 2 by setting the counter 25 according to the extracted time information (Step S230). By this, time correction of the electronic timepiece 2 is performed.

In the case that the timer reaches Ts2 in a state where no advertising packet is received (Step S222: Yes), the scanning is stopped (Step S232). In other words, in the case that no advertising packet is received even if scanning is performed for the time width Ts2, the display 27 displays a message that an error has occurred because the time correction process cannot proceed (Step S234). Then, the process returns to Step S202.

The algorithms of FIG. 8 and FIG. 9 according to the first embodiment can be implemented by hardware, software, and combinations thereof. In the case that the algorithm shown in FIG. 8 is implemented by software, a program constituting the software is installed in the smart phone 1 from a network or a storage medium. For example, the program can be downloaded and installed from a server to the smart phone 1 via the Internet. A medium for recording the program may be the memory 15 (or another storage device included in the smart phone 1) or a removable medium (not shown in the drawings) detachable from the smart phone 1. In this case, the processor 13 performs a series of steps required for the time correction process according to the program, i.e. the algorithm shown in FIG. 8. In the case that the algorithm shown in FIG. 9 is implemented by software, a program constituting the software is installed in the electronic timepiece 2 from a network or a storage medium. A medium for recording the program may be the memory 24 (or another storage device included in the electronic timepiece 2) or a removable medium (not shown in the drawings) detachable from the electronic timepiece 2. In this case, the processor 22 performs a series of steps required for the time correction process according to the program, i.e. the algorithm shown in FIG. 9.

As described above, the time information of the smart phone 1 is transmitted to the electronic timepiece 2 by the role switching between the smart phone 1 and the electronic timepiece 2 without establishing a connection between the devices according to the time correction process of the present embodiment. More specifically, the electronic timepiece 2 transmits information indicating a timing of the role switching by advertising to the smart phone 1 and the smart phone 1 receives the information. Thus, each of them can perform the role switching with an adjusted timing. Then, the smart phone 1 transmits information indicating the current time by advertising and the electronic timepiece 2 receives the information. By this, the time correction of the electronic timepiece 2 can be performed.

Typically, a large amount of data is communicated after a connection between two devices is made because information on services provided by one device and information on characteristics of the services (protocol information, authentication information, profile data, or the like) are transmitted from the one device to the other device by using SDP (Service Discovery Protocol). This increases power consumption of the devices. According to many embodiments of the present invention, it is possible to correct the time of the electronic timepiece 2 while suppressing power consumption as much as possible and removing necessity of the user's troublesome manipulations required for authentication, by transmitting the time information of the smart phone 1 to the electronic timepiece 2 without data communication using the SDP. According to the embodiments of the invention, a total amount of data exchanged between the smart phone 1 and the electronic timepiece 2 is reduced to a level of $\frac{1}{20}$ to $\frac{1}{10}$ compared to the conventional method of performing time correction after a connection between the devices is made. Therefore, power consumption can be significantly reduced.

<Second Embodiment>

Next, a second embodiment of the invention will be described referring to FIG. 10. In the first embodiment, the smart phone 1 and the electronic timepiece 2 communicate in the connection mode in which they can be paired or connected. In the second embodiment, the smart phone 1 and the electronic timepiece 2 communicate in the broadcast mode in which they are not paired and not connected. Therefore, advertising is performed using one of the ADV_NONCONN_IND type advertising packet and the ADV_SCAN_IND type advertising packet. As described above, ADV_NONCONN_IND is used in non-connectable undirected advertising events and ADV_SCAN_IND is used in scannable undirected advertising events.

Figure 10:
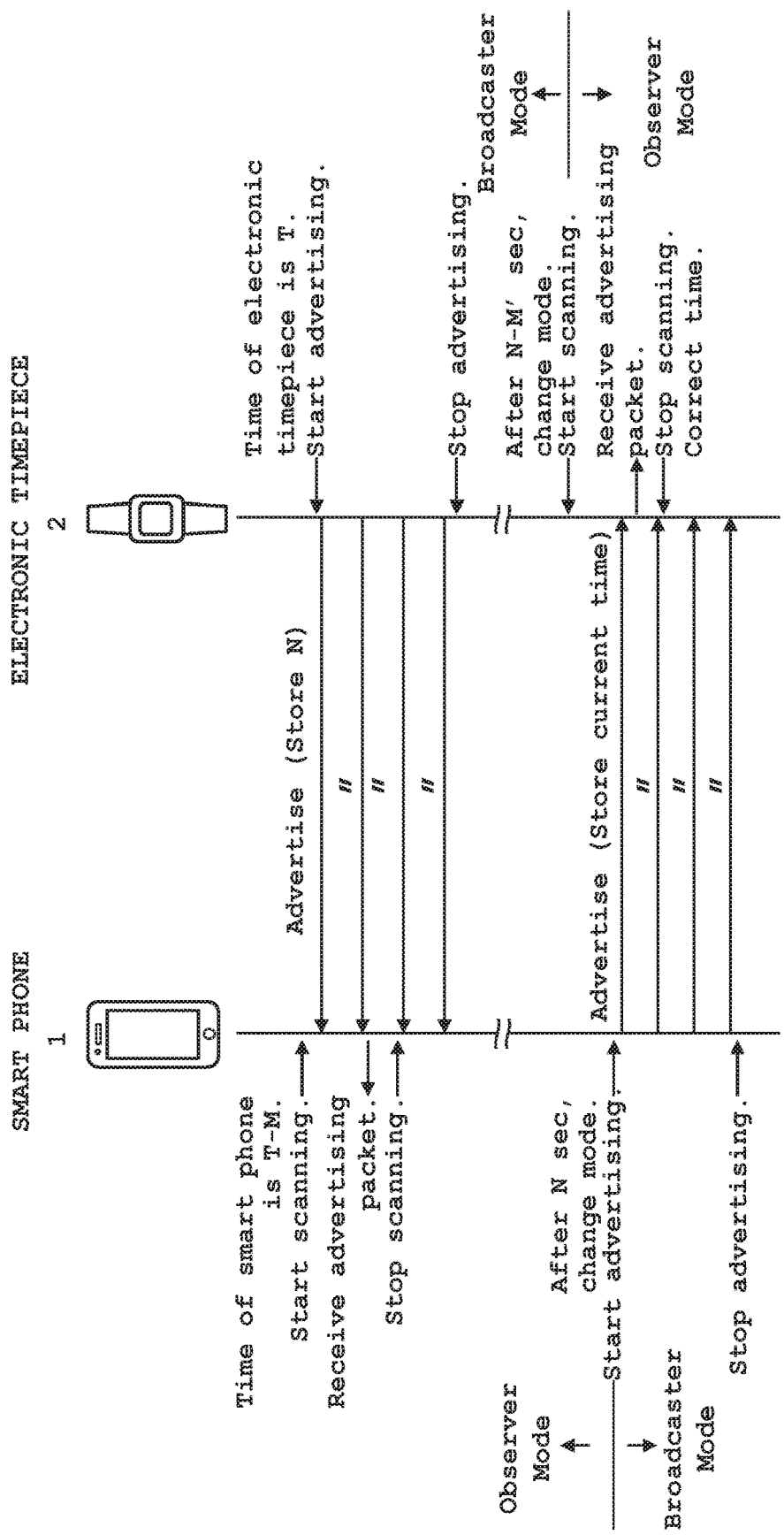
FIG. 10 is a schematic diagram for showing a time correction process according to a second embodiment of the invention.

In the present embodiment, the smart phone 1 changes its communication mode from Observer to Broadcaster and the electronic timepiece 2 changes its communication mode from Broadcaster to Observer, as shown in FIG. 10. In the Observer mode, the smart phone 1 or the electronic timepiece 2 performs scanning for a predetermined period of time in order to detect an advertising packet. In the Broadcaster mode, the smart phone 1 or the electronic timepiece 2 sends advertising packets. According to the second embodiment, time synchronization of two devices can be performed even in the case that the devices cannot be connected.

<Third Embodiment>

Next, a third embodiment of the invention will be described referring to FIG. 11. In the first and second embodiments, the electronic timepiece 2 sends an advertising packet in which the time information N is stored. In the third embodiment, the time information N is previously stored in both of the smart phone 1 and the electronic timepiece 2 and an advertising packet sent from the electronic timepiece 2 does not include the data N.

Figure 11:
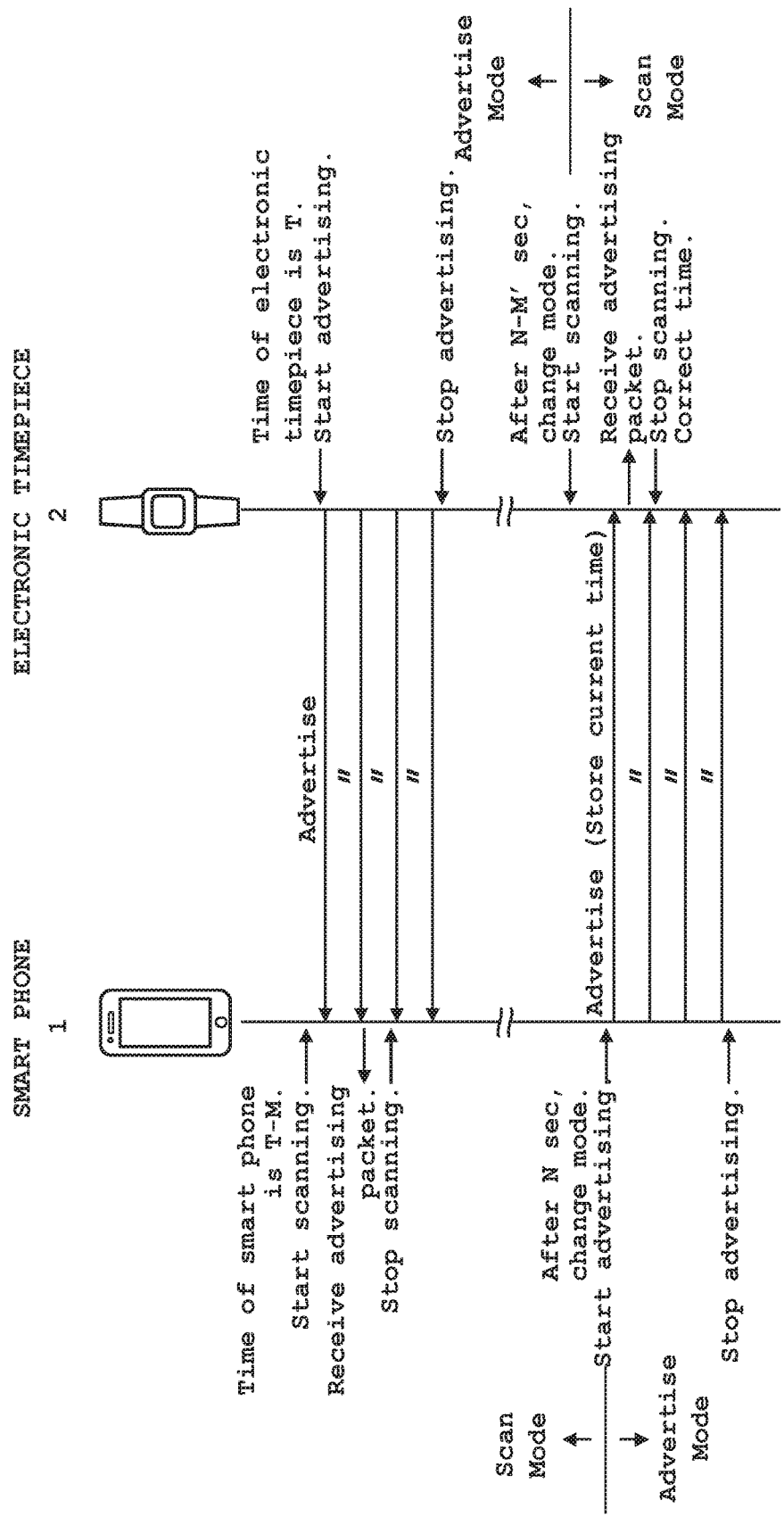
FIG. 11 is a schematic diagram for showing a time correction process according to a third embodiment of the invention.

In FIG. 11, a mode in which a device sends advertising packets is called "Advertise mode". The Advertise mode corresponds to the Peripheral mode of the first embodiment and to the Broadcaster mode of the second embodiment. Further, a mode in which a device scans for an advertising packet is called "Scan mode" in FIG. 11. The Scan mode corresponds to the Central mode of the first embodiment and to the Observer mode of the second embodiment.

As shown in FIG. 11, the electronic timepiece 2 starts advertising at a predetermined time T and sends general advertising packets which do not contain special data in the present embodiment. Therefore, in the present embodiment, the ADV_DIRECT_IND type advertising packet which includes no data part can also be used when the electronic timepiece 2 performs advertising. In addition, the step of extracting the time information N from the received packet (Step S114 in FIG. 8) and the step of storing the time information N in the advertising packet (Step S206 in FIG. 9) are omitted.

<Fourth Embodiment>

Figure 12:
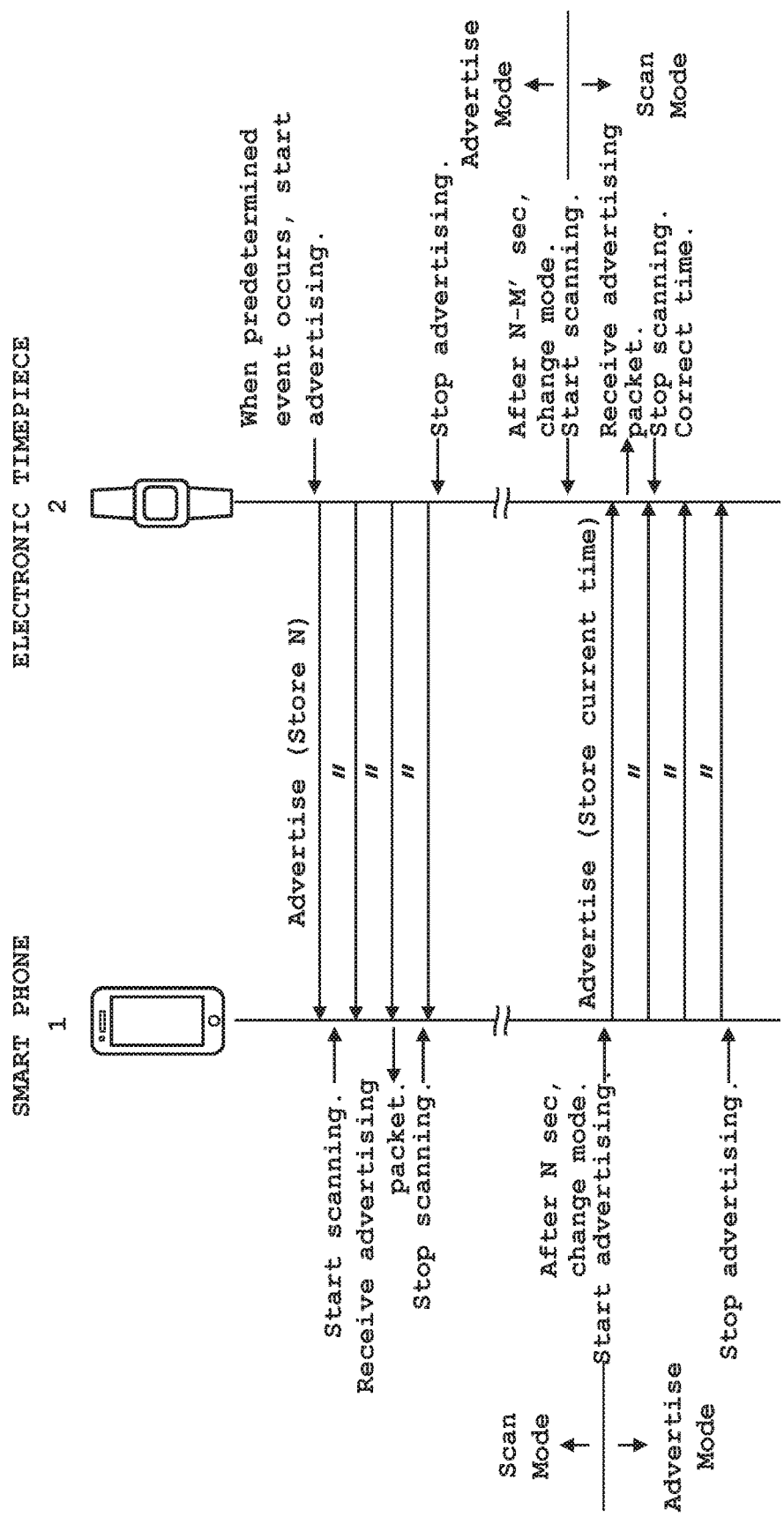
FIG. 12 is a schematic diagram for showing a time correction process according to a fourth embodiment of the invention.

Next, a fourth embodiment of the invention will be described referring to FIG. 12. In the first or second embodiment, the time correction process starts at the predetermined time T. In the fourth embodiment, a time correction process starts in the case that a predetermined event occurs. For example, if the user instructs the electronic timepiece 2 to start the time correction process, the electronic timepiece 2 sends an advertising packet to start the time correction process. In this case, it is desirable to notify the smart phone 1 that the time correction process has started, by storing the time information N in the data part of the advertising packet to distinguish it from the general advertising packet. In the present embodiment, since the smart phone 1 performs scanning at a predetermined period without knowing the timing at which the electronic timepiece 2 starts advertising, there is a high possibility that the smart phone 1 misses the advertising packet sent from the electronic timepiece 2. Therefore, it is desirable to determine the value of the time width Ta2 during which the electronic timepiece 2 performs advertising such that the smart phone 1 can detect the advertising packet.

The present invention has been described with respect to specific embodiments in which it has been applied to Bluetooth, in particular BLE, but its application field is not limited to Bluetooth. For example, the invention can be applied to different wireless communication technologies such as BAN (Body Area Network), Wi-Fi (Registered Trademark), and Wi-Fi Direct (Registered Trademark) if role switching is allowed.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation. These modifications and embodiments fall within the scope and the spirit of the invention described in this specification and within the scope of the invention as defined in the appended claims and equivalents thereof.

What is claimed is:

1. A device capable of wireless communication comprising:
   a counter for counting current time; and
   a processor for setting a communication mode of the device to one of a notification mode in which the device sends a first notification signal for informing of its existence and a detection mode in which the device detects a second notification signal sent from another device,
   wherein, in the case that the communication mode of the device is the notification mode, the processor includes, in the first notification signal, time interval information indicating a time interval from when the other device stops detection to when a communication mode of the other device is to be changed from a detection mode to a notification mode, and
   wherein, in the case that the processor changes the communication mode of the device from the notification mode to the detection mode and the second notification signal received in the detection mode includes first time information, the processor corrects time of the counter based on the first time information.

2. The device of claim 1, wherein the processor changes the communication mode of the device a predetermined period of time before the other device changes the communication mode of the other device.

3. The device of claim 1, wherein the processor starts sending of the first notification signal when the current time counted by the counter is a predetermined time.

4. The device of claim 3, wherein the processor stops detection in the case that the second notification signal including the first time information is not received within a predetermined period of time after the communication mode of the device is changed from the notification mode to the detection mode.

5. The device of claim 4 further comprising a display unit, wherein the processor controls the display unit to display a message indicating that the first time information is not received.

6. The device of claim 1 further comprising a communication unit, wherein the processor instructs the communication unit to start sending the first notification signal if an instruction of a user is input.

7. The device of claim 6, wherein the processor stops detection in the case that the second notification signal including the first time information is not received within a predetermined period of time after the communication mode of the device is changed from the notification mode to the detection mode.

8. The device of claim 1, wherein the device communicates with the other device via a short-distance wireless communication protocol, and the first notification signal is an advertising signal.

9. The device of claim 1, wherein the device communicates with the other device via a short-distance wireless communication protocol, the first notification signal is an advertising packet, and the time interval information is included in a data field of a payload of a protocol data unit (PDU) of the advertising packet.

10. An electronic timepiece comprising a device of claim 1.

11. A time correcting method performed by a device capable of wireless communication and having a time counting function comprising:
setting a communication mode of the device to a notification mode in which the device sends a first notification signal for informing of its existence which includes time interval information indicating a time interval from when another device stops detection to when a communication mode of the other device is to be changed from a detection mode to a notification mode;
changing the communication mode of the device from the notification mode to a detection mode in which the device detects a second notification signal sent from the other device;
receiving the detected second notification signal; and
in the case that the received second notification signal includes time information, correcting time of the device based on the time information.

12. A non-transitory computer-readable recording medium for recording a computer program controlling a device capable of wireless communication and having a time counting function, the program causing the device to perform steps of:
setting a communication mode of the device to a notification mode in which the device sends a first notification signal for informing of its existence which includes time interval information indicating a time interval from when another device stops detection to when a communication mode of the other device is to be changed from a detection mode to a notification mode;
changing the communication mode of the device from the notification mode to a detection mode in which the device detects a second notification signal sent from the other device;
receiving the detected second notification signal; and
in the case that the received second notification signal includes time information, correcting time of the device based on the time information.

13. A device capable of wireless communication comprising:
a counter for counting current time; and
a processor for setting a communication mode of the device to one of a notification mode in which the device sends a first notification signal for informing of its existence and a detection mode in which the device detects a second notification signal sent from another device,
wherein, in the case that the second notification signal is detected in the detection mode and includes time interval information indicating a time interval from when the device stops detection to when the communication mode of the device is to be changed from the detection mode to the notification mode, the processor changes the communication mode from the detection mode to the notification mode according to the time interval information included in the second notification signal and generates the first notification signal including data indicating the current time acquired from the counter.

14. A time correcting method performed by a device capable of wireless communication and having a time counting function comprising:
setting a communication mode of the device to a detection mode in which the device detects a second notification signal from another device;
receiving the detected second notification signal;
changing the communication mode of the device from the detection mode to a notification mode in which the device sends a first notification signal for informing of its existence according to time interval information included in the second notification signal which indicates a time interval from when the device stops detection to when the communication mode of the device is to be changed from the detection mode to the notification mode;
acquiring data indicating current time; and
generating the first notification signal in which the acquired data indicating the current time is included.

15. A non-transitory computer-readable recording medium for recording a computer program controlling a device capable of wireless communication and having a time counting function, the program causing the device to perform steps of:
setting a communication mode of the device to a detection mode in which the device detects a second notification signal from another device;
receiving the detected second notification signal;
changing the communication mode of the device from the detection mode to a notification mode in which the device sends a first notification signal for informing of its existence according to time interval information included in the second notification signal which indicates a time interval from when the device stops detection to when the communication mode of the device is to be changed from the detection mode to the notification mode;

acquiring data indicating current time; and generating the first notification signal in which the acquired data indicating the current time is included.

* * * * *